US011112935B2

(12) United States Patent
Scattolin et al.

(10) Patent No.: US 11,112,935 B2
(45) Date of Patent: Sep. 7, 2021

(54) GRAPHICAL CLOUD APPLICATION MAPPING METHOD AND SYSTEM

(71) Applicant: ORACLE INTERNATIONAL CORPORATION, Redwood Shores, CA (US)

(72) Inventors: Patrice Scattolin, Brossard (CA); François Boulerice, Montréal (CA)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 15/841,380

(22) Filed: Dec. 14, 2017

(65) Prior Publication Data

US 2019/0187877 A1    Jun. 20, 2019

(51) Int. Cl.
| | | |
|---|---|---|
| G06F 3/00 | (2006.01) | |
| G06F 9/00 | (2006.01) | |
| G06F 17/00 | (2019.01) | |
| G06F 3/0481 | (2013.01) | |
| H04L 12/911 | (2013.01) | |
| G06F 16/951 | (2019.01) | |
| G06F 16/29 | (2019.01) | |

(52) U.S. Cl.
CPC .......... *G06F 3/04817* (2013.01); *G06F 16/29* (2019.01); *G06F 16/951* (2019.01); *H04L 47/82* (2013.01)

(58) Field of Classification Search
CPC .... G06F 3/04817; G06F 16/29; G06F 16/951; G06F 8/38; G06F 8/34; H04L 47/82
See application file for complete search history.

(56) References Cited

U.S. PATENT DOCUMENTS

| | | | |
|---|---|---|---|
| 9,436,445 B2 | 9/2016 | Wang et al. | |
| 9,442,810 B2 | 9/2016 | Jaisinghani | |
| 9,621,428 B1 | 4/2017 | Lev et al. | |
| 9,635,134 B2 | 4/2017 | Cao et al. | |
| 2013/0035856 A1* | 2/2013 | Connors | H04W 4/024 701/484 |
| 2014/0337750 A1 | 11/2014 | Chang et al. | |
| 2016/0188877 A1 | 6/2016 | Simha et al. | |

(Continued)

OTHER PUBLICATIONS

Cloudcraft Inc., Visualize Your Cloud, Create Smart AWS Diagrams, pp. 1-4; 2017, downloaded Jun. 28, 2017 from https://cloudcraft.co/.

(Continued)

*Primary Examiner* — Tadesse Hailu
*Assistant Examiner* — Anita D Chaudhuri
(74) *Attorney, Agent, or Firm* — Kraguljac Law Group, LLC

(57) ABSTRACT

Systems, methods, and other embodiments associated with generating a map of cloud resources are described. In one embodiment, a method includes receiving a cloud resource icon that represents a cloud resource, and generating a map of the cloud application including the received cloud resource icon. Based on information received about a relationship between resource icons in the map, a graphical representation of the relationship is included in the map. A search string input to the client terminal is received, and an appearance of a satisfying resource icon or a non-satisfying resource icon is modified within the map to graphically distinguish the satisfying icon from the non-satisfying icon.

19 Claims, 6 Drawing Sheets

(56) References Cited

U.S. PATENT DOCUMENTS

2017/0085446 A1* 3/2017 Zhong .................. H04L 43/045
2017/0093645 A1* 3/2017 Zhong .................. G06F 3/0482
2017/0366403 A1* 12/2017 Gawron ............... H04L 41/046

OTHER PUBLICATIONS

Xiaohui Ji, Graphical User Interface for Software Defined Network Cloud Simulator, pp. 1-32, Nov. 2014, downloaded from: http://www.cloudbus.org/students/XiaojuiJi-MastersMinorThesis2014.pdf.

Servicenow, Inc., ServiceNow Cloud Management, pp. 1-13, 2016, downloaded from: https://www.servicenow.com/content/dam/servicenow/documents/whitpapers/servicenow-cloud-management-accelerating-and-strengthening-cloud-development.pdf.

IBM, Modeling and Automating Middleware Topologies Virtual System Patterns, pp. 1-3, downloaded Jun. 28, 2017 from: https://www.ibm.com/developerworks/community/blogs/explorepatterns/entry/modeling_and_automating_middleware_topologies_virtual_system_patterns?lang=en.

Fazio et al., Virtual Resource Management Based on Software Transactional Memory, pp. 1-4, downloaded Jun. 28, 17 from: http://ieeexplore.IEEE.org/document/6123430/.

* cited by examiner

GRAPHICAL CLOUD APPLICATION MAPPING METHOD AND SYSTEM

BACKGROUND

Current cloud management solutions use table-based, text interfaces in which each cloud resources are represented by tables. To configure a cloud resource to be deployed in a cloud application, a user has traditionally been required to manually type values for the various parameters of the cloud resources into the tables. For example, a storage volume may be connected to an instance within a cloud application. To configure such an arrangement, multiple pages of the table for each resource must be manually updated to include information such as the name of the other instance, a network address of the other instance, etc.

Table-based configuration interfaces are complex to use from the user's perspective to configure a cloud application. The resulting pages of tables also do not convey current information about the state of the cloud application, or individual resources thereof. Further, locating specific resources of interest within the cloud application is not supported by table-based interfaces, which makes locating individual resources or groups of resources within an expansive cloud application inefficient and difficult.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
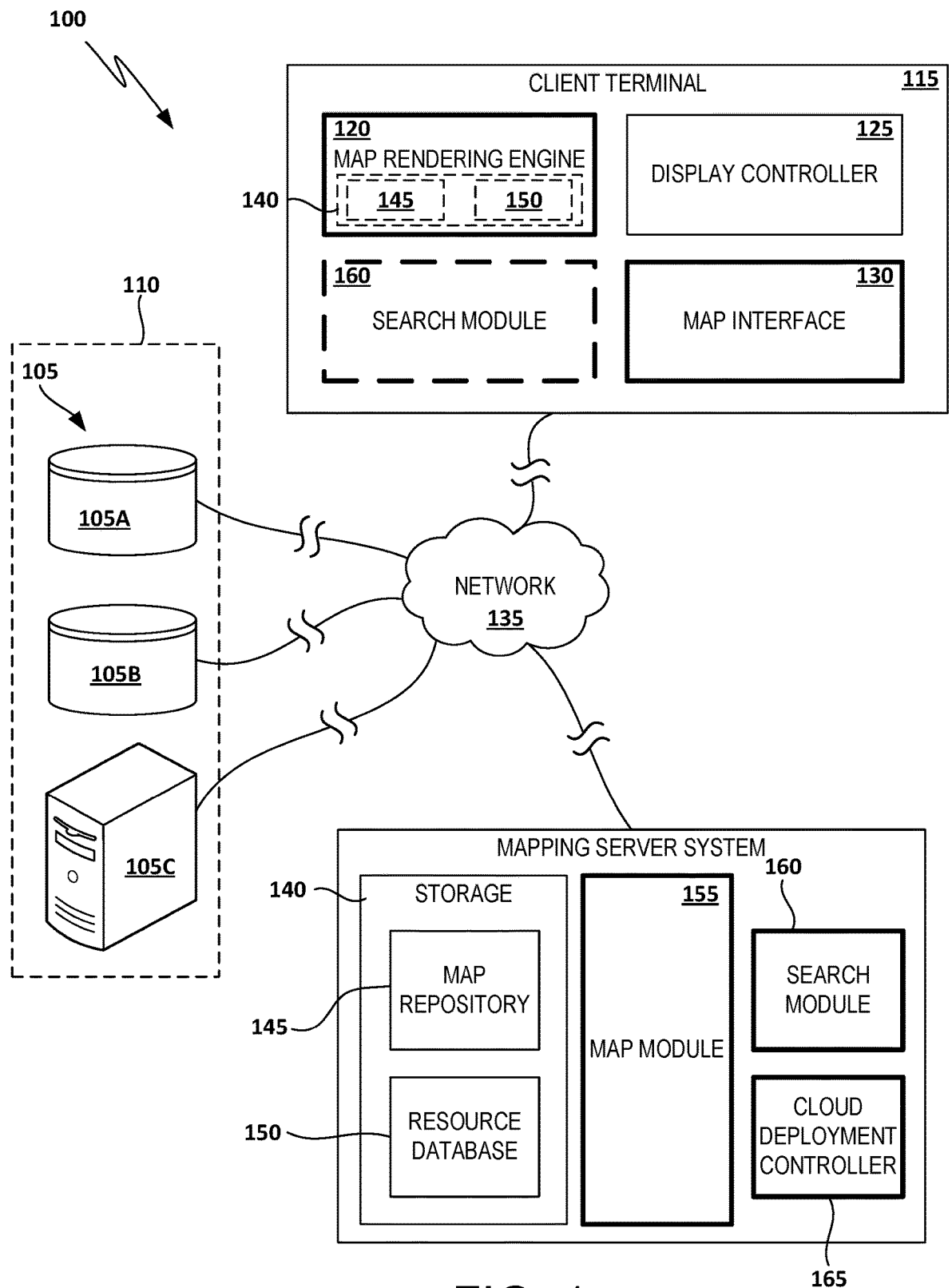
FIG. 1 illustrates an embodiment of a web-based mapping system that generates a map of a cloud application.

Systems and methods are described herein that generate and utilize interfaces displaying graphical representations of resources arranged in cloud applications. The parameters and relationships established between graphical representations of resources in the interfaces configure and control the deployment of the actual resources for the cloud applications.

Graphical representations of resources included in cloud applications, referred to herein as resource icons, are concurrently displayed together in a common graphical user interface displayed within a web browser, for example. The resource icons arranged within the graphical user interface is referred to herein as a map. Embodiments of the present systems and methods support the generation, modification and deletion of maps configured based on graphical programming operations input by a user, and received by a client terminal. For a web-based embodiment of the present disclosure, a server serves content to the client terminal. The served content can be used by the client terminal to display the graphical user interface that can be manipulated by a user to build, edit and delete maps, or portions thereof, on the client terminal. Thus, the client terminal uses the served content and a web browser application running on the client terminal to display the graphical user interface.

The graphical programming operations are converted by the client terminal into properties of the affected resource icons appearing in the maps displayed within the web browser. For example, resource icons to be included in a cloud application can be obtained from a palette displayed by the client terminal and placed in the map. Connection lines can be generated between resource icons such as a cloud storage icon and an instance within a map. The connection lines are created based on a graphical (e.g., drag-and-drop) input received by a client application (e.g., web browser) running on the client terminal. Such connection lines define relationships, communication channels, network addresses or other underlying properties of the linked resource icons. For example, a computer pointing device such as a mouse, trackball, touch-sensitive display, or other input device can be used to draw a connector between the linked resource icons. Similarly, a drag and drop mechanism of a resource icon from a palette into the map is used according to one embodiment for the creation of a new graphical representation of a cloud resource in the map. Once added to the map, the new resource icons representing cloud resources can be updated based on additional graphical programming operations or text entry received by the client application.

According to one embodiment, all map creation, editing and deletion operations can be executed by the client terminal running the web browser to create, edit and delete a map. For such an embodiment, creation, editing and deletion operations can optionally be completed locally, by the client terminal, without communicating with a remote server or other network resource after the served content is received by the client terminal to generate the graphical user interface. A newly-created, edited or deleted map can be saved locally by the client terminal, remotely by a network-connected server or storage device, or a combination thereof. For an embodiment where the configuration of the newly-created, edited or deleted map is transmitted to a remote server or storage device over a communication network, the configuration can be transmitted after a milestone has been achieved (e.g., after creation, editing or deletion of the map is complete, as a result of a command received by the client terminal to so transmit the newly-created, edited or deleted map over the communication network, etc.). For such an embodiment, the map can also be stored locally for the purpose of maintaining the user's existing view of the map. Thus, when the map stored by the remote server or storage device is refreshed to include edits made by the user during a session, the layout of the remotely-stored map may be updated to a layout that differs from the layout of the locally-stored map. The locally-stored version of the map, however, can include the layout being edited by the user that existed prior to the refresh of the remotely-stored map. As a result, the refresh of the remotely-stored map is transparent to the user, and allows the user's development of the locally-stored map to continue without a layout change resulting from the refresh of the remotely-stored map. The user's productivity is improved through the use of a familiar interface.

According to another embodiment, input received by the client terminal to create, edit or delete a map can be used by the client terminal to manipulate the map. Updates to the map can be transmitted to a remotely-located server over a communication network in response to completion of certain operations. For example, the client terminal can receive commands via the graphical user interface displayed by the web browser. The client terminal can graphically update the appearance of the map by inserting a selected resource icon, drawing a connection line, etc., within the map. One or more properties associated with the updated map graphic (often requested by the client terminal in an input dialog box) can be received by the client terminal. Once at least the required properties for the resource icon being edited is received, the client terminal can submit the received properties to the server for validation. Successful validation by the server indicates that the cloud resource represented by the resource icon or connection line being edited in the map is available and accessible to the cloud application under development. In response to receiving confirmation that validation was successful, the map can be updated to include the final version of the resource icon or the connection line. If, however, validation at the server is unsuccessful, the corresponding resource icon or connection line in the map can be deleted, highlighted to include an appearance that identifies it as being not being validated, etc. A cloud resource that is not successfully validated may be offline, malfunctioning, or otherwise unavailable to be allocated to the cloud application being configured using the map.

Maps often become quite expansive and complex, including a wide variety of networked cloud storage, instances, security rules, Internet Protocol ("IP") networks, IP exchanges, defined lists of users granted permission to access a cloud application, security rules, etc. To facilitate the location of resource icons representing specific cloud resources within a map, an embodiment of the present systems and methods utilizes a search module that highlights those resource icons in the map. One or more search criteria input into a search field within the graphical user interface of a map interface described herein is received and defines at least one quality of interest to be searched for. The search module highlights one or more of the resource icons representing resources that satisfy the received search criteria. Highlighting such resource icons relative to the resource icons representing other cloud resources that do not satisfy the received search criteria improves the ability of the map to be efficiently searched.

The arrangement of cloud resource icons appearing in the maps described herein can be used by the present system to control the deployment of the actual hardware, software, permissions and other cloud resources. For example, an array of non-transitory computer readable media that are accessible over a communication network can be allocated to a cloud application to satisfy the storage needs represented in a map. Network communications between the system and the deployed cloud resources modifies an appearance of the graphical representations of cloud resources in maps to convey status information about the deployed cloud resources.

Accordingly, the present systems and methods mitigate the complexity of table-based systems to configure a cloud application by converting graphical programming operations into a configuration of a cloud application. The present systems and method also sense and display current status information about cloud application, or individual cloud resources therein, within the graphical user interface that includes the map. Further, the present search module locates specific resources of interest within the cloud application to improve the efficiency of locating individual resources or groups of instances within a map for an expansive cloud application.

Figure 2:
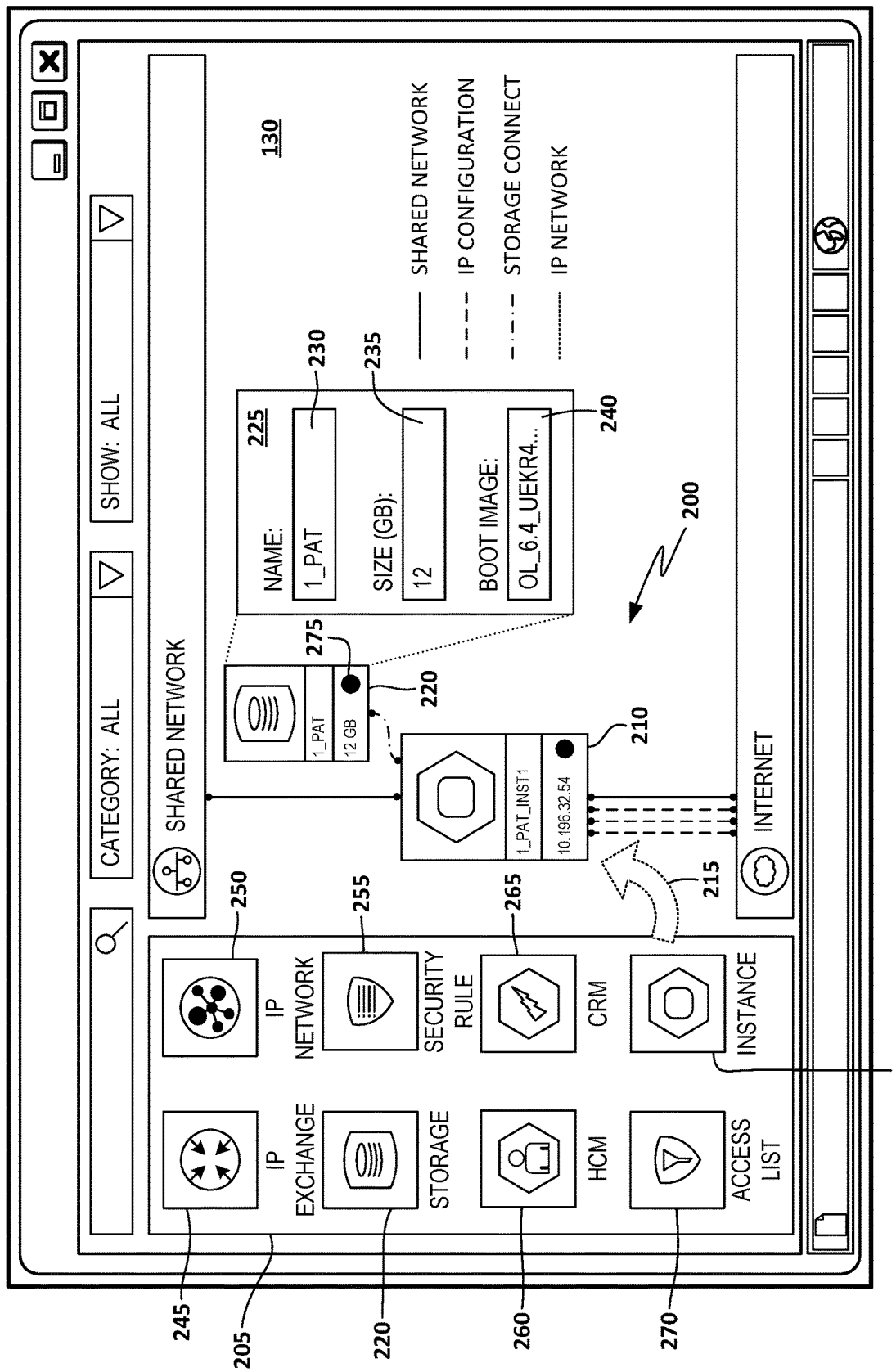
FIG. 2 illustrates an embodiment of a map of a cloud application being constructed with a web-based mapping system.
Figure 3:
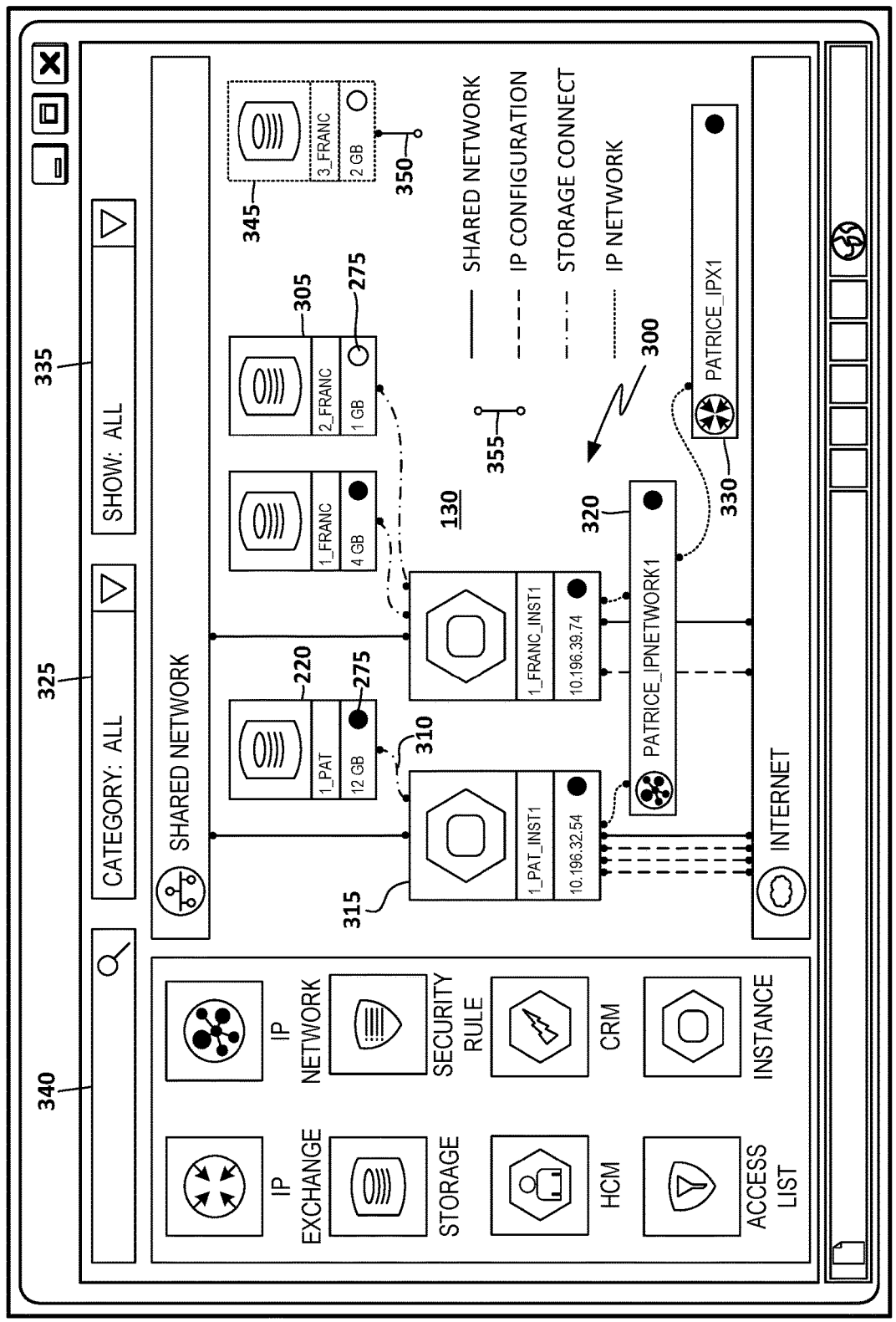
FIG. 3 illustrates an embodiment of a constructed map of a cloud application, with specific resources connected together and at least one resource having an incomplete connection.
Figure 4:
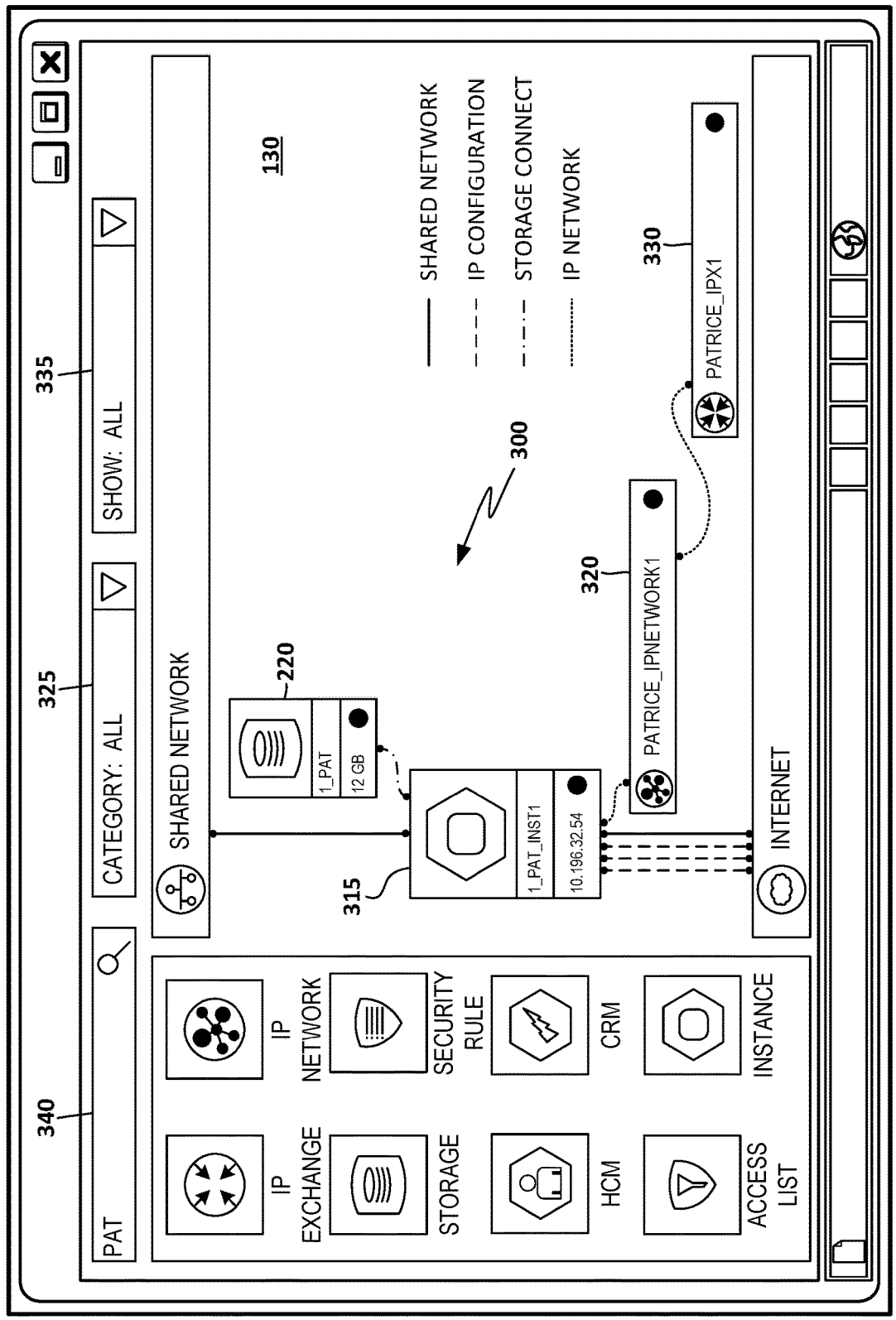
FIG. 4 illustrates an embodiment of a map of a cloud application, with results satisfying a search criteria highlighted relative to other results that do not satisfy the search criteria.

With reference to the drawings, FIG. 1 depicts a system environment for generating a map of a cloud application 105 to be deployed in a network-accessible computing environment 110. Based on content served by a mapping server system 100 and user input received by a client application (e.g., web browser) executed by a client terminal 115, the client terminal 115 generates the map that specifies a logical topology of the cloud application 105. Client terminal 115 comprises a map rendering engine 120 that executes instructions of the client application to receive user input and generate data that is to be used by a display controller 125 to graphically display the map. For example, the display controller 125 selectively activates pixels or other display units of a display device to cause a map interface 130 to be displayed by the client application. The map interface 130, described in greater detail below with reference to FIGS. 2-4, is a graphical user interface ("GUI") that includes a region in which the map is displayed and can be edited based on user input received by the client terminal 115. An embodiment of the map interface 130 can also include a palette of available resource icons that are selectable to be inserted into the map in response to the client terminal 115 receiving graphical programming operations input into the client application.

According to one embodiment, the client terminal 115 can execute instructions served by different hosts and/or virtual machines (not shown) in a client-server relationship, or on a common host or virtual machine (VM) such as the server system 100. The client terminal 115 or the system server 100 can be a computing device 600, as shown and described with reference to FIG. 6. For example, the map rendering engine 120 may execute a client application such as a web browser. The map rendering engine 120 uses the web browser to render a map interface 130 described herein, and receives the user input for generating the map to be displayed by the display controller 125. According to such an embodiment, the map rendering engine 120 is configured to: render the map for a new cloud application 105, modify an existing map of a cloud application 105 in the GUI of the map interface 130, or delete an existing map of the cloud application 105. The map rendering engine 120 may include a client-side library of scripting code served or otherwise provided by the server system 100 or another host. The scripting code can be executed by the client terminal 115 to render resource graphics in the map interface 130. Configured in this manner, the map rendering engine 120 can receive content served by the server system 100 to render the map interface 130, in which maps can be created, edited and deleted.

Resource graphics are virtual representations of cloud resources that are available to be deployed in the cloud application 105. For example, cloud storage 105A, 105B available to be deployed in the cloud application 105 is represented by storage icons within the map. As another example, compute engine instances 105C that include a virtual server located in a public or private cloud network are represented by instance icons. Three cloud resources 105A, 105B, 105C are shown in the illustrative cloud application 105 of FIG. 1, but any number of cloud resources, and optionally all available cloud resources, can be deployed to form a part of the cloud application 105.

In some embodiments, the map rendering engine 120 can include a JavaScript library downloaded from the server system 100 or other host over a communication network 135 to render the GUI of the map interface 130 based on web documents such as HTML content. For example, when a user directs the client terminal 115 to access the server system 100 through entry of a Uniform Resource Locator ("URL") into the web browser to be used to display the GUI of the map interface 130. In response, the server system 100 may return the HTML content required to generate the map and the map interface 130, or identify where such HTML content can be obtained. The content returned by the server system 100 can also include multimedia files (e.g., GIFs, MPEGs), which can be used with local content stored on the client terminal 115 by the map rendering engine 120 to generate the GUI of the map interface 130. While the present disclosure describes functions performed by the client terminal 115 and the server system 100, it should be noted that other embodiments may differently distribute functions between client terminal 115 and the server system 100, e.g., shifting functionality between the server-side and the client-side. For example, the embodiments of the client terminal 115 are described herein as receiving content from the server system 100 that allows the client terminal 115 to generate the map interface 130 and create, edit and delete maps. However, according to other embodiments, the client terminal 115 can transmit content defining user input to the server system 100 so the server system 100 can create, edit and delete maps, and serve maps to the client terminal 115.

The embodiment of the server system 100 shown in FIG. 1 can be a computing/data processing system including an application or collection of distributed applications for enterprise organizations. The applications and server system 100 may be configured to operate with or be implemented as a cloud-based networking system, a software as a service (SaaS) architecture, or other type of networked computing solution. In one embodiment the server system 100 serves content to the client terminal 115, allowing the client terminal to perform at least the functions disclosed herein with respect to creating, editing and deleting maps. The server system 100 can be accessed by many users via separate, remotely-located computing devices/terminals communicating with the server system 100 (functioning as the server) over the computer network 135, to allow those remotely located devices/terminals to create, edit and delete maps as described herein.

In one embodiment, one or more of the components or aspects of the server system 100 or the client terminal 115 described herein are configured as program modules stored in a non-transitory computer readable medium. The program modules are configured with stored instructions that when executed by at least a processor cause the computing device (s) of the server system 100 or the client terminal 115 to perform the corresponding function(s) as described herein.

As shown in FIG. 1, the server system 100 includes a storage device 140 including a non-transitory computer-readable medium (or an array of media) that maintains a map repository 145 and a resource database 150. The map repository 145 stores maps created as described herein. The stored maps can later be accessed over the communication network 135 to be edited to reflect updates in a respective cloud application. The resource database 150 stores a library of resource icons that are available to be dragged and dropped, or otherwise inserted into a map with another graphical programming operation. The storage device 140, the map repository 145 and the resource database 150 are shown in FIG. 1 as being integrated as local components of the server system 100. However, other embodiments of the server system 100 can include a distributed storage device 140, map repository 145 or resource database 150, that are separate from the server system 100 and accessed by the server system 100 over the communication network 135. According to another embodiment, the client terminal 115 can include the storage device 140 that stores the map repository 145 or the resource database 150, as indicated by broken lines in FIG. 1. For such an embodiment, the maps created and edited as described herein can be stored locally, by the client terminal 115, in the map repository 145.

The map rendering engine 120 of the client terminal 115 is described above as rendering the map interface 130 based on content served from the server system 100, and performing the steps of creating, editing and deleting the maps described herein. However, an embodiment of the server system 100 can include a map module 155 that receives selections of resource icons based on user input into the client terminal 115 to generate and edit maps. For the present embodiment, the map module 155 also receives user input transmitted by the client terminal 115 specifying relationships between the selected resource icons within a map or specifying other parameters associated with the selected resource icons. In response to receiving such user input, the map module 155 modifies the map to add a new resource icon to the map, or add a graphical representation (e.g., lines) of the relationships between resource icons. Embodiments of the map module 155 can transmit updates (e.g., a newly-added resource icon, a relationship between existing resource icons in a map, etc.) in real time to the client terminal 115 over the communication network 135.

Embodiments of the server system 100 shown in FIG. 1 also include a search module 160 that receives one or more search criteria entered by a user in a search field in the map interface 130 displayed by the client terminal 115. According to other embodiments, the client terminal 115 can be provided with the search module 160, as indicated in broken lines in FIG. 1, to conduct searches, without the need to communicate with the server system 100 as part of the search. The search module 160 conducts a comparison of the received search criteria to parameters for the resource icons included in a map. An appearance of resource icons in the map that satisfy the received search criteria (hereinafter "satisfying icons"), is caused by the search module 160 to be different from an appearance of the resource icons in the map that do not satisfy the search criteria (hereinafter "non-satisfying icons"). Resource icons within the map that are connected to the satisfying icons, directly or within a defined number of degrees of separation, can also be provided with an appearance different from the non-satisfying icons. For example, the search module 160, in response to receiving the search criteria, may filter the non-satisfying icons from the map, leaving the satisfying icons and the resource icons connected to the satisfying icons. When filtered, the non-satisfying icons are omitted, masked or otherwise concealed from view within the map according to a user-defined preference until a time when the search criterion/criteria is/are cleared. According to some embodiments, the non-satisfying icons may be "grayed out" while the satisfying icons are shown in full color. For some embodiments, the results of a search can be shown as at least three different levels. Satisfying icons can be shown in full color, the non-satisfying icons connected directly (e.g., no intermediary icons between a directly-connected non-satisfying icon and the satisfying icon) to a satisfying icon can be shown in color, but at 50% of the intensity or brightness of the colors of satisfying icons, and the remainder of the non-satisfying icons can be shown grayed out. For any of the embodiments, providing different appearances to the satisfying icons (and any connected resource icons) and the non-satisfying icons facilitates the efficient location and possible modification of the satisfying icons.

A cloud deployment controller 165 can be provided to embodiments of the server system 100 to control deployment of the cloud resources represented in one or more maps as part of the cloud application 105. The cloud deployment controller 165 can be operatively connected to the cloud resources 105A, 105B, 105C to grant authorized end users access to a cloud application 105. For example, a defined set of end users with the necessary permission to access a cloud application can be represented by a security resource icon in the map. Such authorized end users can be identified by IP address, email domain, username/password combination, etc., specified by parameters established for the security resource icon using the map interface 130. The cloud deployment controller 165 can restrict access to the cloud application 105 to those authorized end users identified by the parameters for the security resource icon. According to one embodiment, controlling the deployment of cloud resources based on the resource icons included in the map can involve associating a network address of a resource icon with the network address of another resource icon in the map. Such an association can be saved locally by the client terminal 115, as part of the system in the map repository 145, or in any other network-accessible storage device.

FIG. 2 illustrates one embodiment of a map interface 130 for creating or editing a map 200 including a graphical layout of cloud resources of a cloud application 105. As shown, the map interface is displayed within a web-browser application as the client application. The map 200 is constructed by adding resource icons to the map 200 through graphical programming operations input to the web-browser application executed by the client terminal 115. An existing map can also be retrieved from the map repository 145 or any other storage device, and edited using graphical programming operations. Graphical programming operations involve the placement of icons or other image-based objects within a portion of the map interface 130. Parameters of icons placed in the map can be specified through text entry in a dialog box or other suitable data entry field such as a pull-down menu, radio button, check boxes, etc. For example, resource icons can be dragged from a palette 205 that includes a menu of resource icons available for addition to the map 200. In FIG. 2, an instance icon 210 is dragged from the palette 205 in the direction generally indicated by arrow 215 into the map 200. The instance icon 210 is a graphical representation of a compute engine instance, such as the virtual server 105C of the cloud application 105, for example, and indicates computational resources allocated for the cloud application 105. Parameters associated with the added compute engine instance added to the map can be entered by the user into the map interface 130, thereby identifying which, of the compute engine resources available in the cloud, is to be allocated to the cloud application 105.

Also shown in FIG. 2 is a storage icon 220 that has been dragged and dropped into the map 200. The storage icon 220 represents cloud storage allocated to the cloud application 105. In response to being added to the map 200, a parameter entry box 225 is displayed in the web-browser application, prompting user input of storage parameters. For the illustrated embodiment, fields are displayed by the client terminal 115 for receiving entry of a name 230, a desired storage capacity 235, and a boot image 240 of the cloud storage to be included in the cloud application 105. The parameters requested for each resource icon added to the map 200 can be different, or a common, generic dialog box or other data entry interface can be used for a plurality of different resource icons. Parameters entered in the parameter entry box 225 are transmitted to, and received by the server system 100 to be validated, confirming the availability of the corresponding cloud resource for allocation in the cloud application 105.

Once a resource icon has been added to the map 200, the resource icon is displayed, and can initially have an appearance indicating that the added resource icon is pending validation. For example, as shown in FIG. 3, the added cloud storage icon 345 is represented in broken lines in the map 300, indicating that the corresponding cloud storage has yet to be validated. The parameters entered for the added resource icon are transmitted over the communication network 105 to be validated by the server system 100. Successful validation by the server system 100 indicates that the cloud resource represented by the added resource icon is available, satisfies any criteria specified by the parameters (e.g., has at least 2 GB of storage capacity for the illustrative icon 345 in the map 300 of FIG. 3), and is accessible to the cloud application 105 under development.

In response to receiving confirmation that validation was successful, the map rendering engine 120 updates the icon 345, providing the icon 345 with an appearance that indicates the corresponding cloud storage has been successfully validated. If, however, validation at the server system 100 is unsuccessful, the icon 345 in the map 300 can be deleted, highlighted to include an appearance that identifies it as not being validated, etc. A cloud resource that is not successfully validated may be offline, malfunctioning, or otherwise unavailable to be allocated to the cloud application 105 being configured using the map 300.

Once the cloud resource corresponding to the icon 345 is validated, the icon 345 is said to become "sensitive." A sensitive icon is effective to allocate the corresponding cloud resource to the cloud application 105, and can be provided with status or descriptive information. For example, the storage icon 220 added to the map 200 in FIG. 2 appears with a name "1_PAT," and a storage capacity of "12 GB," which were specified when the storage icon 220 was added to the map 200. Such parameters can be updated by accessing the map 200 stored by the map repository 145, selecting the resource icon to be updated, and changing the parameters that were previously entered. Additionally, a status indicator 275 can be provided to each resource icon in the map 200 to indicate a status of the corresponding cloud resource in the cloud application 105. For example, a solid status indicator 275 such as that shown on the storage icon 220 in FIG. 2 indicates that the corresponding cloud storage is online, has available capacity, and is accessible to the cloud application 105. As such, the corresponding cloud storage device is configured within the cloud to communicate with, and store data transmitted and requested by the computational resources represented by the instance icon 210, which is linked by a connection line to the storage icon 220 in the map. An unfilled status indicator 275 such as that shown on the storage indicator 305 in FIG. 3 indicates that a problem may exist that could interfere with operation of the corresponding cloud storage, as configured. For example, the cloud storage may have experienced a mechanical malfunction, be at maximum capacity, or may have lost a network connection that renders the cloud storage inaccessible to the cloud application 110. In the case of compute engine instances, there can be more than two possible values for the status indicator 275. For example, in a green state, the status indicator 275 indicates a properly functioning compute engine instance. Similarly, in a red state, the status indicator 275 indicates a malfunctioning or offline compute engine instance. In a yellow state, the status indicator 275 indicates that the compute engine instance is in an intermediate state between green and red, such as during initialization, updating, starting or stopping of the compute engine instance.

The icon 345 in FIG. 3 also illustrates a resource icon having an incomplete connection line 350 to another resource icon in the map 300. The incomplete connection line 350 is connected at one end to the icon 345 representing cloud storage. However, the opposite end of the connection line 350 is not connected to another resource icon. Parameters associated with the icon 345 having the incomplete connection line 350 can be transmitted to the server system 100 so the corresponding cloud resource can be validated as described herein. In response to successful validation, the icon 345 can be sensitized with the incomplete connection. The unconnected end of the connection line 350 can be dragged to a second resource icon in the map 300, regardless of whether the second resource icon is added to the map 300 before or after validation of the icon 345 with the incomplete connection. Upon connecting the unconnected end to the second resource icon, the relationship between the resource icons in the map 300, and accordingly, the corresponding cloud resources, can be established.

Standalone connections 355, shown in FIG. 3, can also be supported by the map interface 130. A standalone connection 355 appears as a connection line with both ends unconnected to resource icons. As resource icons to which one or both ends of the standalone connection 355 are to be connected are added to the map 300, the standalone connection 355 can be connected to those resource icons to establish the relationship there between. Accordingly, the present systems and methods support partially-configured resource icons and connections being added to the map 300 and validated, and their respective cloud resources deployed in the cloud application. Standalone connections can be drawn in the map interface 130 by the appropriate graphical programming operation (e.g., drawing a line in the map interface 130), or an existing connection line between two icons can be detached at one or both ends. For example, the connection line 310 can be selected and a "detach" option can be selected from a menu displayed to the user. Selection of the detach option results in at least one end, or optionally both ends of the connection line 310, as specified by the user in input to the client terminal 115, to be disconnected from the source and/or target icon. The resulting connection line can represent an incomplete connection or a standalone connection, which can then be "re-parented," or subsequently connected at one or both ends to an icon in the map interface 130. Re-parenting a connection link can be accomplished by dragging and dropping the end(s) of the connection line to the desired icon in the map interface 130 where a connection is to be established.

In addition to the instance icon 210 and the storage icon 220, an icon for any resource available to be included in a cloud application can be included in the palette 205. For example, the palette 205 includes, but is not limited to:

An IP exchange icon 245 that represents a communication interconnection model for the exchange of IP based traffic between customers of different operators as well as other types of service provider, via an IP-based Network-to-Network interface;

An IP network icon 250 that defines an IP subnet in the cloud application 105;

A security icon 255 that defines rules and parameters used to safeguard information within the cloud application 105;

A security protocol icon defining a security protocol used to protect the cloud application 105; and An access icon 270 that includes a database of authorized users who are permitted to access the cloud application 105.

The resource icons populating the palette 205 can be served by the system 100 from the resource database 150 to the client terminal 115 for use in the web-browser application as described herein. One embodiment includes a plurality of resource icons stored locally by the client terminal 115 to populate the palette 205. Regardless of where the resource icons are stored, instructions to add resource icons to the map 200 are transmitted over the communication network 135 to be received by the system 100 to generate the map 200.

FIG. 3 illustrates one embodiment of a map 300 for a cloud application 105 created by users Patrice and Francois. For the present example, resource icons including the term "PAT" in the icon name were created by Patrice, and resource icons including the term "FRANC" in the icon name were created by Francois. The names assigned to each resource icon in the map were chosen merely as a matter of convenience for illustrative purposes. Different cloud storage has been allocated to various compute engine instances in the cloud application 105. The relationship between Patrice's cloud storage and Patrice's compute instance is established in the map 300 by the line 310 or other connector drawn in the map interface 130 between the respective resource icons 220, 315. Drawing the line 310 or otherwise connecting related resource icons in the map 300 can be achieved with a computer pointing peripheral within the map interface 130. The relationship between linked resource icons is created locally within the web browser of the client terminal 115, but transmitted to, and received by the server system 100 for validation. Based on the formation of the connector line 310 in FIG. 3, data read/write processes involving the compute engine corresponding to the instance icon 315 will be performed using the cloud storage corresponding to the storage icon 220.

The connection line between icons can be rendered selectable for selecting the icon attached to each end of the connection line. For example, selecting a connection line 310 selects the instance icon 315 and the storage icon 220. The selected icons are rendered active for the performance of map editing operations, while the other instances in the map, including those connected to the instance icon 315 and the storage icon 220, are left unselected.

For the embodiment of the map 300 illustrated in FIG. 3, resource icons such as Patrice's IP Network 320 ("PATRICE_IPNETWORK1") represent a cloud resource created by Patrice that is also used by cloud resources created by Francois. As noted above, one shortcoming of traditional cloud application management systems is the difficulty in locating resource icons of interest within expansive maps 300, which limits the usefulness of traditional cloud management systems. The search module 160 of the present system 100, however, executes a search that graphically distinguishes one or more resource icons of interest from at least a second resource icon that is not of interest. The result of the search is a reduced subset of resource icons to sort through when attempting to locate a specific resource icon of interest.

For example, the map interface 130 in FIG. 3 includes a plurality of search tools that are operable to specify one or more search criteria within the map interface 130 displayed by the web browser application, to be received by the system 100. A search field 340 allows for free text entry of a search string to be used as search criteria. According to one embodiment, the entered text is received by the system 100, and the search module 160, in response to receiving the text, conducts a comparison of the received text to parameters for the resource icons included in a map. As shown in FIG. 1, the search module 160 can be configured at the client terminal 115, allowing the search to be performed locally, without communications between the client terminal 115 and the remote server. For other embodiments, the search module 160 can be configured at the remote server, allowing for a search to be executed by the remote server. For the illustrative example shown in FIG. 4, the term "PAT" was entered into the search field 340. The term "PAT" is the first three letters of administrator Patrice's name. The resulting search executed by the search module 160 allows all satisfying resource icons that include "PAT" in the name assigned to those resource icons to remain visible in the map 300, but the remaining, non-satisfying resource icons are hidden from view. Although the foregoing example was a search based on text in a name field, other embodiments can conduct a search of any field associated with resource icons in the map 300. Any party accessing the map 300 can conduct such a search to efficiently explore resource icons.

Modifying the appearance of either the satisfying resource icons or the non-satisfying resource icons, or both, can involve any transformation from a native state of such icons that creates a visible difference between the satisfying and non-satisfying resource icons. For example, non-satisfying resource icons, other than those connected directly to a satisfying resource icon can be grayed out, moved to the back, moved forward, selected, or rendered unselectable, while the satisfying resources are shown in full color, and are selectable to be moved forward, backward or otherwise highlighted. According to one embodiment, modifying the appearance of either the satisfying resource icons or the non-satisfying resource icons, or both, can involve concealing the non-satisfying resource icons from view within the map 300, as shown in FIG. 4, leaving only the satisfying resources within view. The remaining satisfying resources in view can be stacked to conserve space according to a user-specified preference. For some embodiments, the results of a search can be shown in at least three different levels. Satisfying icons can be shown in full color, the non-satisfying icons connected directly (e.g., no intermediary icons between a directly-connected non-satisfying icon and the satisfying icon) to a satisfying icon can be shown in color, but at a fraction (e.g., 50%) of the intensity or brightness of the colors of satisfying icons, and the remainder of the non-satisfying icons can be shown grayed out. Hovering a cursor over a specific instance in the stack will move that instance to the front to be selectable by the user.

With continued reference to FIG. 3, a category dropdown menu 325 is another example of a search tool. The dropdown menu 325 can be populated with the general categories of resource icons included in the map 300. For the illustrated embodiment in FIG. 3, storage icons 220, 305, instance icons 315, an IP network icon 320, and an IP Exchange icon 330 are the categories of resource icons present in the map 300. One or more of such categories can be selected from the drop down menu 325, and the selected category received by the search module 160 to define the search criteria. In response to receiving the selected category, the search module 160 modifies an appearance of one or more of the satisfying resource icons within the map 300 that fall within the selected category. According to one embodiment, the search module 160 modifies an appearance of one or more non-satisfying resource icons within the map 300 similar to the modifications of the satisfying and/or non-satisfying icons for a search described above. By modifying either the satisfying resource icons or the non-satisfying resource icons, or both, the search module 160 graphically distinguishes between the two. Referring again to the example in FIG. 3, a selection of the IP Network category would have highlighted the IP network icon 320, relative to all other resource icons in categories other than the IP network category. Such a selection can be limited to the IP network icons 320 owned or managed by a specific entity, or allocated to a specific cloud application.

Another embodiment of a search tool includes a filter dropdown menu 335. The filter dropdown menu 335 can be populated with a comprehensive list of the name of each individual resource icon, instead of categories of icons, included in the map 300. Each entry in the dropdown menu 335 is linked to a checkbox, allowing for selection of each of the specific, individual resource icons to be highlighted in the map 300.

The client terminal 115 can also be configured to, based on content served by the remote server of the system 100, follow a connection line to a source icon or a target icon. For example, selection of one end of the connection line 310 adjacent to an icon in the map interface 130 can result in a menu being displayed within the map interface 130, or elsewhere, by a display device of the client terminal 115. Within the menu can be an option to scroll the map to, or center the map on the icon attached to the opposite end of the selected connection line 310, or the opposite end of the selected connection line, regardless of whether that opposite end is attached to an icon within the map. The option to scroll to the end of the connection line 310 can be selectable from a menu displayed as a result of selecting either or both ends of the connection line 310. The scrolling operation results in the opposite end of the connection line 310 being made visible within the map interface 130.

As another example, the option to scroll to an end of the connection line 310 can be selectable from a menu displayed as a result of selecting any portion of the connection line 310. Selection of the connection line 310 in the map interface 130 can result in an option to scroll to the instance icon 315, which is the target of the connection line 310. Selection of such a scroll option centers the map appearing in the map interface 130 on the instance icon 315, or at least brings the instance icon 315 into view within the map interface 130. For the example shown in FIG. 3, the connection line 310 extending between the source icon (storage icon 220) and the instance icon 315 is short, and both the storage icon 220 and the instance icon 315 can appear on one page, without scrolling. However, the option to scroll to the target icon may prove to be useful when the target icon is spaced such a distance apart from the source icon that the target icon and the source icon do not appear within the confines of a display device. The user in such a situation would be required to scroll the display vertically or horizontally until the target icon is located. However, using the present scroll option that is selectable within the map interface 130, the map is repositioned to be centered on the target object within the map interface 130. The option to scroll to the source icon is similar to the option to scroll to the target icon. But instead of centering the map on the target icon, the map is centered on the source icon within the map interface.

Figure 5:
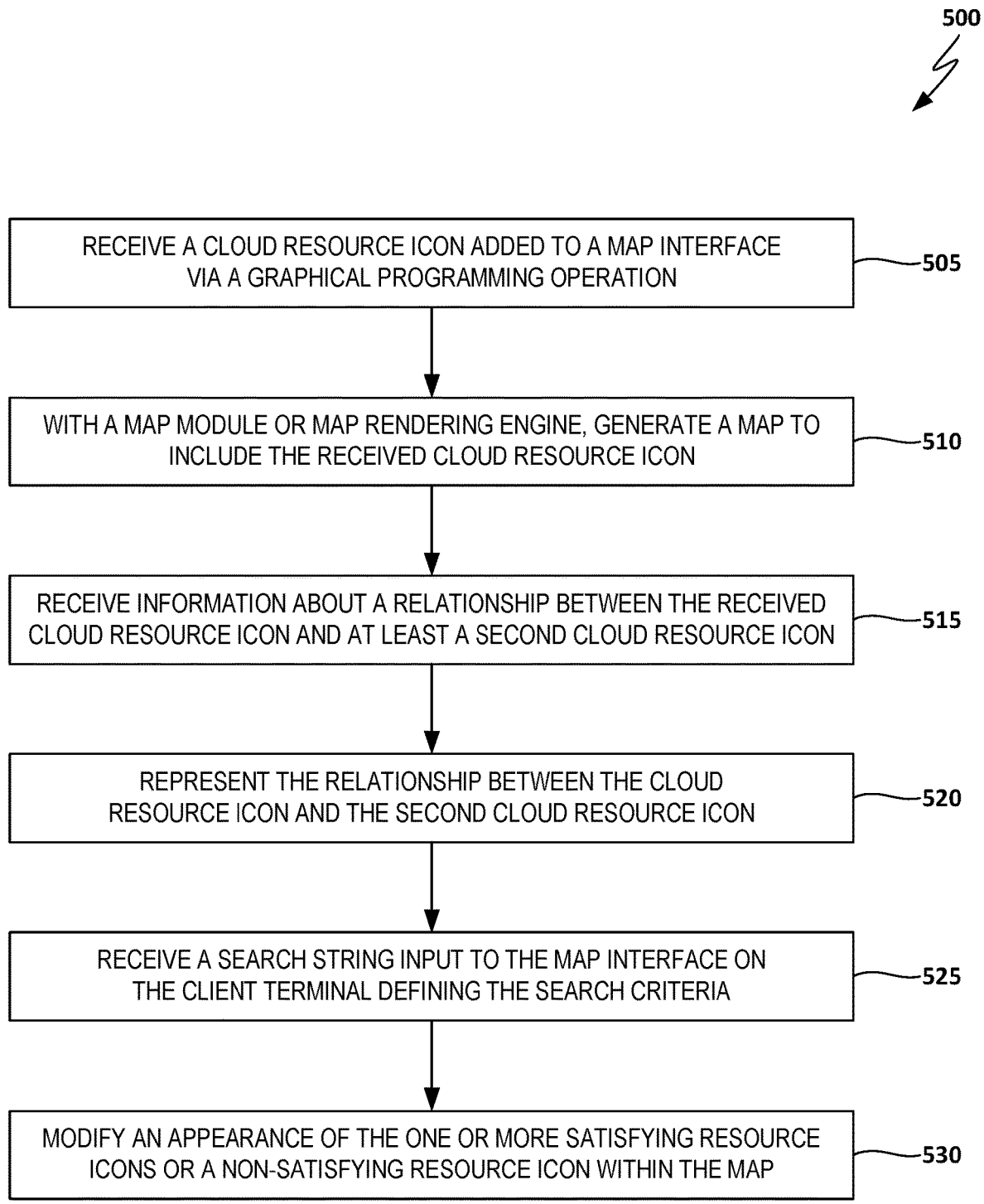
FIG. 5 is a flow diagram illustrating a method associated with managing a map of cloud resource icons.

FIG. 5 is a flow diagram illustrating a method 500 associated with managing a map of cloud resource icons. According to the illustrated embodiment of the method, a cloud resource icon is received at 505 to represent a cloud resource to be included in a cloud application. The cloud resource icon is received in response to a performance of a graphic programming operation, such as dragging and dropping the cloud resource icon into a map interface 130, for example, performed within a web browser running on the remote client terminal 115. A map of the cloud application 105 is generated by the map module 155 or map rendering engine 120 at 510 to include the cloud resource icon that was dragged and dropped in the map interface 130. For embodiments where the map is generated by the map module 155 of the server system 100, the generated map and any updates made to the map by the map module 155 can be served by the system 100 in real time to the client terminal 115 over the communication network 135. As a result, the map interface 130 displayed within the web browser by the map rendering engine 120 and the display controller 125 will reflect the generated map, as updated.

Parameters entered into the map interface 130 for each resource icon added to the map can be transmitted to the server system 100 for validation. In response to successful validation at the server system 100, the map rendering engine 120 sensitizes the map icon, and the corresponding cloud resource is deployed in the application 105 according to the map.

The map rendering engine 120 or the server system 100 receives, at 515, information about a relationship between the received cloud resource icon and at least a second cloud resource icon that represents a second cloud resource of the cloud application. The information about the relationship can be received in response to a graphical programming operation performed within the map interface 130, such as the drawing of a connector between the cloud resource icon and the second cloud resource icon. A graphical representation of the relationship is generated at 520 between the received cloud resource icon and the second cloud resource icon within the map.

More specifically, The graphical programming operation performed identifies the need to create a connection between a source and a target within the map. A tentative connection from the origin point to the mouse drop off point in the map is created. The appropriate connection type is determined, and the correct value is stored in the corresponding property field of the object holding the information about the connection. Both source and target objects are made insensitive to avoid responding to user interaction until the update operation that comes next succeeds or fails.

An update operation is transmitted via the communication network to the device or object corresponding to one or more of the icons storing the connection information. Upon success a connection between both icons is added. Redrawing of both icons positions the connection at it's proper order in the list of connections on that edge of the shape (e.g., top or bottom). Both linked icons are made sensitive and can accept future user input.

To improve the usefulness of the map, a search module 160 can conduct a search for satisfying resource icons. The search can be executed by receiving a search string input to the map interface 130 on the client terminal 115 defining the search criteria at step 525. An appearance of one or more satisfying resource icons or a non-satisfying resource icon within the map is modified at 530 from a native appearance to graphically distinguish the one or more satisfying resource icons from the non-satisfying resource icon.

Figure 6:
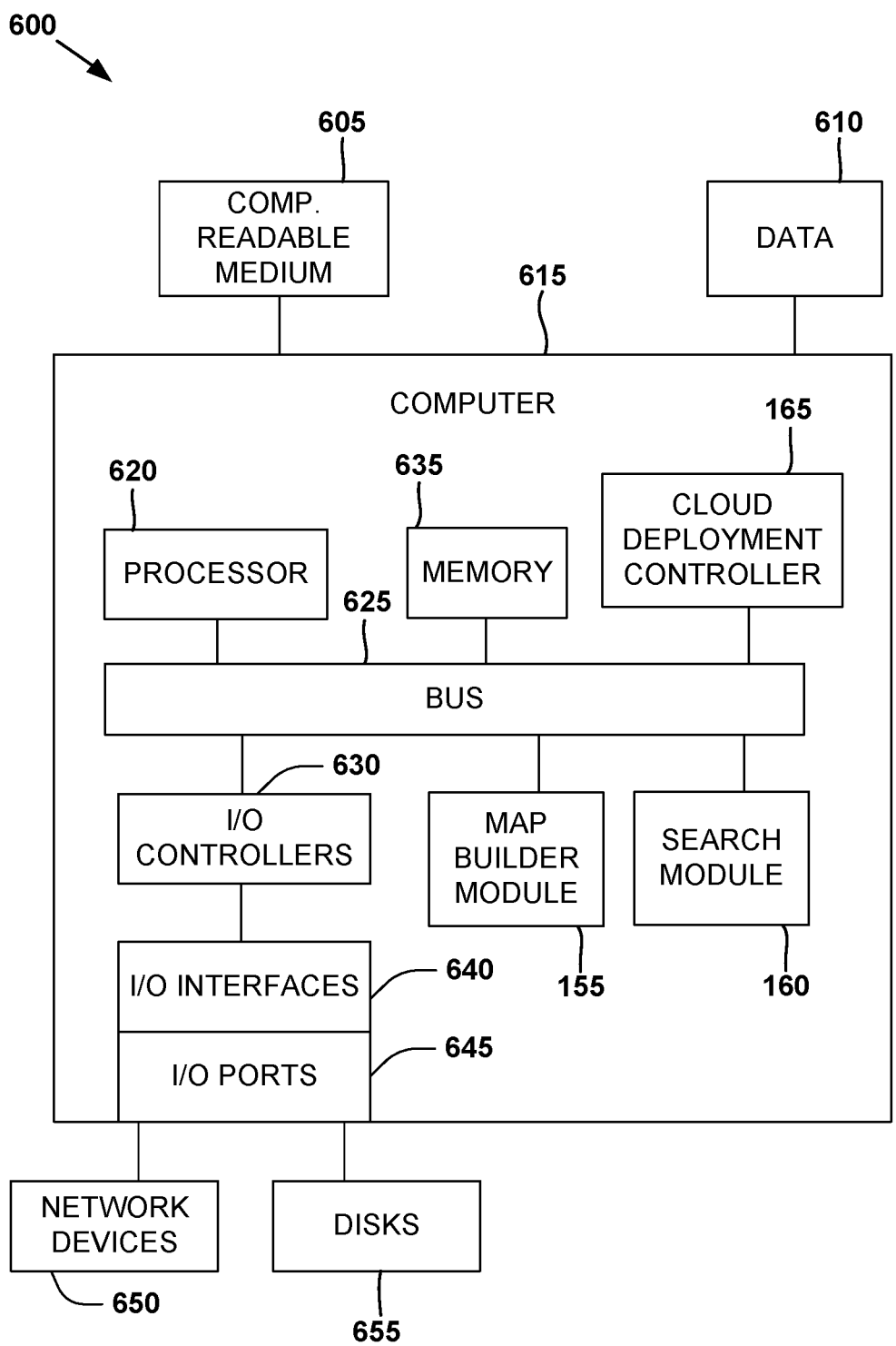
FIG. 6 illustrates an example computing device that is configured and/or programmed in accordance with one or more of the illustrative systems and methods described herein.

FIG. 6 illustrates an example of a computing device 600 that is configured and/or programmed with one or more of the example systems and methods described herein, and/or equivalents. The illustrative example of a computing device 600 may be a computer 615 that includes a processor 620, a memory 635, and I/O ports 645 operably connected by a bus 625. In one embodiment, the computer 615 may include logic of the map rendering engine 120, display controller 125, map module 155, search module 160, and/or the cloud deployment module 165, configured to facilitate the client terminal 115, the server system 100, and/or the method described with respect to FIGS. 1-5. In different embodiments, the logic of the map rendering engine 120, display controller 125, map module 155, search module 160, or the cloud deployment module 165 may be implemented in hardware, a non-transitory computer-readable medium 605 with stored instructions, firmware, and/or combinations thereof. While the logic of the map module 155, search module 160, and the cloud deployment module 165 is illustrated as a hardware component attached to the bus 625, it is to be appreciated that in other embodiments, the logic of this module could be implemented in the processor 620, stored in memory 635, or stored in disk 655.

In one embodiment, logic of the map rendering engine 120, display controller 125, map module 155, search module 160, and the cloud deployment module 165 or the computer 615 is a means (e.g., structure: hardware, non-transitory computer-readable medium, firmware) for performing the actions described. In some embodiments, the computing device 600 may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the map rendering engine 120, display controller 125, map module 155, search module 160, and the cloud deployment module 165 may also provide means (e.g., hardware, non-transitory computer-readable medium 605 that stores executable instructions, firmware) for map creation, editing and deletion.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In one embodiment, a computing device is implemented with one or more executable algorithms that are configured to perform any of the disclosed methods.

For example, in the SaaS architecture, an application is delivered in a manner that enables organizations, individual users or other subscribers to subscribe to software application services running on hardware located at, and maintained by a SaaS provider. The SaaS provider manages and maintains the necessary computational resources such as servers, networking resources, storage as well as the software for the SaaS applications, possibly at a remote location relative to the subscriber facilities. These SaaS applications can be accessed across the Internet through web browsers or other suitable clients. Shifting the management obligations to the SaaS provider eliminates the need for the subscribers to manage or maintain the underlying data, SaaS applications, servers, storage, network, or operating systems, for example.

As another example, the one or more machine(s) that execute computer-executable instructions to perform the methods described herein can be maintained in a Platform as a Service (PaaS) architecture. Similar to the SaaS architecture, the machines configured include but are not limited to a platform comprising a processor, computer, storage, a server, operating system, host networking hardware, etc. operating in a cloud computing system. Under the PaaS architecture, however, the subscriber may be responsible for maintaining and managing a software application running on the platform managed by the third-party platform provider.

The subscriber may also create and manage data generated through the use of the platform.

Some platform providers that offer on-demand cloud computing services under a PaaS or SaaS architecture have also built infrastructure control applications and application program interfaces (APIs). Such infrastructure control applications and APIs enable subscribers to interact with the infrastructure managed by those infrastructure providers over the Internet to run applications, manage data generated through use of the infrastructure similar a PaaS architecture. However, the infrastructure control applications and APIs enable the subscribers to also manage the operating system, runtime environments or middleware. Outsourced infrastructure providers offering cloud computing services under such an architecture are often referred to as an Infrastructure as a Service (IaaS) provider, and the architecture referred to simply as IaaS. In one embodiment, the one or more machine(s) that execute computer-executable instructions to perform the methods described herein can be maintained for use by subscribers under such an IaaS architecture.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure" or "data object", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons who consume energy from a utility, computers or other devices operated by or on behalf of such persons, or combinations thereof.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least one processor of a computing system, cause the computing system to:
   generate, on a display, a map interface configured with a palette of available resource icons that are selectable for insertion into a map in response to receiving graphical programming operations including a drag-and-drop operation;
   generate the map of a cloud application including a plurality of cloud resource icons that are selected from the palette, wherein the plurality of cloud resource icons represents a plurality of cloud resources in the cloud application for deployment;
   receive a graphic programming operation to add a cloud resource icon that represents a first cloud resource to be included in the cloud application, wherein the cloud resource icon is received in response to the graphic programming operation performed within the palette of the map interface;
   update the map of the cloud application by including and displaying the received cloud resource icon on the map and including a connection line to at least one of the plurality of cloud resource icons, where the connection line represents a relationship between connected icons;
   wherein the map displays an arrangement of the plurality of cloud resource icons and the relationships between connected icons;
   in response to displaying the received cloud resource icon on the map, display a parameter entry box that prompts input of parameters for the received cloud resource icon in one or more fields and for the relationship of the connection line;
   in response to receiving the parameters for the first cloud resource represented by the received cloud resource icon, validating and confirming availability of the first cloud resource for allocation in the cloud application;

wherein successful validation indicates that the first cloud resource represented by the received cloud resource icon in the map is available and accessible to the cloud application being developed for deployment;

in response to being validated, (i) deploying the first cloud resource in the cloud application according to the map, and (ii) updating an appearance of the received cloud resource icon on the map to indicate that validation was successful;

control deployment of actual resources for the cloud application including hardware, software, and permissions that are represented by the plurality of cloud resource icons and associated parameters, wherein the deployment is controlled based on at least the arrangement of the plurality of cloud resource icons in the map, the parameters, and the relationships established between the plurality of cloud resource icons in the map of the cloud application;

wherein deploying the first cloud resource comprises:
(i) granting access to one or more users to allow access to the cloud application and the plurality of cloud resources in the map including the first cloud resource; and
(ii) associating a first network address of the first cloud resource to a second network address of a second cloud resource icon in the map of the cloud application based on at least the parameters;

in response to receiving a search string input to the client terminal defining a search for one or more satisfying resource icons within the map that satisfy the search string, identify the one or more satisfying resource icons; and modify an appearance of the one or more satisfying resource icons or a non-satisfying resource icon from the plurality of resource icons within the map to graphically distinguish the one or more satisfying resource icons from the non-satisfying resource icon, wherein the non-satisfying icon does not satisfy the received search string.

2. The non-transitory computer-readable medium of claim 1 wherein granting access to the one or more users further comprising instructions that, when executed by the at least one processor, cause the computing system to:
control access to the cloud application by the one or more users based on a data set associated with the received cloud resource icon included in the map.

3. The non-transitory computer-readable medium of claim 1 further comprising instructions that, when executed by the at least one processor, cause the computing system to:
control deployment of the first cloud resource in the cloud application based on the received cloud resource icon in the map.

4. The non-transitory computer-readable medium of claim 1, wherein the information about the relationship between the received cloud resource icon and the second cloud resource icon is received in response to a graphical programming operation performed in the application executed by the client terminal;
wherein the graphical programming operation comprises drawing, with a computer pointing device, the connection line between the received cloud resource icon and the second cloud resource icon within the map;
wherein the instructions further comprise instructions for modifying the appearance of the non-satisfying resource icon to conceal the non-satisfying resource icon from view within the map; and wherein the search string comprises at least a portion of a name of the one or more satisfying resource icons.

5. The non-transitory computer-readable medium of claim 1, wherein the appearance of the non-satisfying resource icon is modified to conceal the non-satisfying resource icon from view within the map.

6. The non-transitory computer-readable medium of claim 1, wherein the search string comprises at least a portion of a name of the one or more satisfying resource icons.

7. A computing system, comprising:
at least one processor connected to at least one memory;
a map module stored on a non-transitory computer readable medium and including instructions that, when executed by the at least one processor, cause the computing system to:

generate, on a display, a map interface configured with a palette of available resource icons that are selectable for insertion into a map in response to receiving graphical programming operations including a drag-and-drop operation;

generate the map of a cloud application including a plurality of cloud resource icons that are selected from the palette, wherein the plurality of cloud resource icons represents a plurality of cloud resources in the cloud application for deployment;

receive a graphic programming operation to add a cloud resource icon that represents a first cloud resource to be included in the cloud application, wherein the cloud resource icon is received in response to the graphic programming operation performed within the palette of the map interface;

update the map of the cloud application by including and displaying the received cloud resource icon on the map and including a connection line to at least one of the plurality of cloud resource icons, where the connection line represents a relationship between connected icons;

wherein the map displays an arrangement of the plurality of cloud resource icons and the relationships between connected icons;

in response to displaying the received cloud resource icon on the map, display a parameter entry box that prompts input of parameters for the received cloud resource icon in one or more fields and for the relationship of the connection line;

in response to receiving the parameters for the first cloud resource represented by the received cloud resource icon, validating and confirming availability of the first cloud resource for allocation in the cloud application;

wherein successful validation indicates that the first cloud resource represented by the received cloud resource icon in the map is available and accessible to the cloud application being developed for deployment;

in response to being validated, (i) deploying the first cloud resource in the cloud application according to the map, and (ii) updating an appearance of the received cloud resource icon on the map to indicate that validation was successful;

control deployment of actual resources for the cloud application including hardware, software, and permissions that are represented by the plurality of cloud resource icons and associated parameters, wherein the deployment is controlled based on at least the arrangement of the plurality of cloud resource icons in the map, the parameters, and the relationships established between the plurality of cloud resource icons in the map of the cloud application;

wherein deploying the first cloud resource comprises:
(i) granting access to one or more users to allow access to the cloud application and the plurality of cloud resources in the map including the first cloud resource; and
(ii) associating a first network address of the first cloud resource to a second network address of a second cloud resource icon in the map of the cloud application based on at least the parameters; and a search module stored on the non-transitory computer readable medium and including instructions that, when executed by the at least one processor, cause the computing system to:
receive a search string input to the client terminal defining a search for one or more satisfying resource icons within the map that satisfy the search string; and
modify an appearance of the one or more satisfying resource icons or a non-satisfying resource icon from the plurality of resource icons within the map to graphically distinguish the one or more satisfying resource icons from the non-satisfying resource icon, wherein the non-satisfying icon does not satisfy the received search string.

8. The computing system of claim 7, wherein the map module further includes instructions for granting access to the one or more users that, when executed by the at least one processor, cause the computing system to:
control access to the cloud application by the one or more users based on a data set associated with the received cloud resource icon included in the map.

9. The computing system of claim 7 further comprising a cloud deployment module stored on the non-transitory computer readable medium and including instructions that, when executed by the at least one processor, cause the computing system to:
control deployment of the cloud resource in the cloud application based on the received cloud resource icon in the map.

10. The computing system of claim 7, wherein the map module receives the information about the relationship between the received cloud resource icon and the second cloud resource icon in response to a graphical programming operation performed using the client terminal.

11. The computing system of claim 10, wherein the graphical programming operation comprises drawing, with a computer pointing device, the connection line between the received cloud resource icon and the second cloud resource icon within the map.

12. The computing system of claim 7, wherein the search module conceals the non-satisfying resource icon from view within the map.

13. The computing system of claim 7, wherein the search string comprises at least a portion of a name of the satisfying resource icon, and the search module graphically distinguishes the one or more satisfying resource icons from the non-satisfying resource icon based on names assigned to the received cloud resource icon and the second cloud resource icon.

14. A computer-implemented method, the method comprising:
generating, on a display, a map interface configured with a palette of available resource icons that are selectable for insertion into a map in response to receiving graphical programming operations including a drag-and-drop operation;
generating the map of a cloud application including a plurality of cloud resource icons that are selected from the palette, wherein the plurality of cloud resource icons represents a plurality of cloud resources in the cloud application for deployment;
receiving a graphic programming operation to add a cloud resource icon that represents a first cloud resource to be included in the cloud application, wherein the cloud resource icon is received in response to the graphic programming operation performed within the palette of the map interface;
updating the map of the cloud application by including the received cloud resource icon and displaying the received cloud resource icon on the map and including a connection line to at least one of the plurality of cloud resource icons, where the connection line represents a relationship between connected icons;
wherein the map displays an arrangement of the plurality of cloud resource icons and the relationships between connected icons;
in response to displaying the received cloud resource icon on the map, displaying a parameter entry box that prompts input of parameters for the received cloud resource icon in one or more fields and for the relationship of the connection line;
in response to receiving the parameters for the first cloud resource represented by the received cloud resource icon, validating and confirming availability of the first cloud resource for allocation in the cloud application;
wherein successful validation indicates that the first cloud resource represented by the received cloud resource icon in the map is available and accessible to the cloud application being developed for deployment;
in response to being validated, (i) deploying the first cloud resource in the cloud application according to the map, and (ii) updating an appearance of the received cloud resource icon on the map to indicate that validation was successful;
controlling deployment of actual resources for the cloud application including hardware, software, and permissions that are represented by the plurality of cloud resource icons and associated parameters, wherein the deployment is controlled based on at least the arrangement of the plurality of cloud resource icons in the map, the parameters, and the relationships established between the plurality of cloud resource icons in the map of the cloud application;
wherein deploying the first cloud resource comprises:
(i) granting access to one or more users to allow access to the cloud application and the plurality of cloud resources in the map including the first cloud resource; and
(ii) associating a first network address of the first cloud resource to a second network address of a second cloud resource icon in the map of the cloud application based on at least the parameters;
in response to receiving a search string input to the client terminal defining a search for one or more satisfying resource icons within the map that satisfy the search string, identifying the one or more satisfying resource icons; and
modifying an appearance of the one or more satisfying resource icons or a non-satisfying resource icon from the plurality of resource icons within the map to graphically distinguish the one or more satisfying resource icons from the non-satisfying resource icon, wherein the non-satisfying icon does not satisfy the received search string.

15. The method of claim 14, wherein granting access to the one or more users further comprising:
controlling access to the cloud application by one or more users based on a data set associated with the received cloud resource icon included in the map.

16. The method of claim 14 further comprising:
controlling deployment of the cloud resource in the cloud application based on the received cloud resource icon in the map.

17. The method of claim 14, wherein the information about the relationship between the received cloud resource icon and the second cloud resource icon is received in response to a graphical programming operation performed in the application executed by the client terminal.

18. The method of claim 14, wherein the appearance of the non-satisfying resource icon is modified to conceal the non-satisfying resource icon from view within the map.

19. The method of claim 14, wherein the search string comprises at least a portion of a name of the one or more satisfying resource icons.

\* \* \* \* \*

UNITED STATES PATENT AND TRADEMARK OFFICE
CERTIFICATE OF CORRECTION

| | |
|---|---|
| PATENT NO. | : 11,112,935 B2 |
| APPLICATION NO. | : 15/841380 |
| DATED | : September 7, 2021 |
| INVENTOR(S) | : Scattolin et al. |

It is certified that error appears in the above-identified patent and that said Letters Patent is hereby corrected as shown below:

In the Specification

In Column 13, Line 47, delete "The" and insert -- the --, therefor.

In Column 17, Line 17, delete "read only" and insert -- read-only --, therefor.

In the Claims

In Column 19, Line 39, in Claim 1, delete "non-satisfying icon" and insert -- non-satisfying resource icon --, therefor.

In Column 21, Line 24, in Claim 7, delete "non-satisfying icon" and insert -- non-satisfying resource icon --, therefor.

In Column 23, Line 2, in Claim 14, delete "non-satisfying icon" and insert -- non-satisfying resource icon --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*